US012557905B2

(12) United States Patent
Martinez

(10) Patent No.: US 12,557,905 B2
(45) Date of Patent: Feb. 24, 2026

(54) MODULAR TRAY SYSTEMS AND METHODS OF USING

(71) Applicant: Michael A. Martinez, Hobart, IN (US)

(72) Inventor: Michael A. Martinez, Hobart, IN (US)

( * ) Notice: Subject to any disclaimer, the term of this patent is extended or adjusted under 35 U.S.C. 154(b) by 106 days.

(21) Appl. No.: 18/363,326

(22) Filed: Aug. 1, 2023

(65) Prior Publication Data

US 2024/0032686 A1 Feb. 1, 2024

Related U.S. Application Data

(60) Provisional application No. 63/394,268, filed on Aug. 1, 2022.

(51) Int. Cl.
| | |
|---|---|
| *A47B 23/00* | (2006.01) |
| *A47G 23/02* | (2006.01) |
| *A47G 29/093* | (2006.01) |
| *F16M 11/22* | (2006.01) |
| *F16M 13/02* | (2006.01) |
| *F16M 13/04* | (2006.01) |

(52) U.S. Cl.
CPC ............ *A47B 23/001* (2013.01); *A47G 23/02* (2013.01); *A47G 29/093* (2013.01); *F16M 11/22* (2013.01); *F16M 13/02* (2013.01); *F16M 13/04* (2013.01)

(58) Field of Classification Search
CPC .... A47B 23/001; A47G 23/02; A47G 29/093; F16M 11/22; F16M 13/02; F16M 13/04
See application file for complete search history.

(56) References Cited

U.S. PATENT DOCUMENTS

| | | | | |
|---|---|---|---|---|
| D270,506 S | * | 9/1983 | Thorne | ........................ D7/552.1 |
| 4,662,676 A | * | 5/1987 | Havelock | ............... A47C 7/705 |
| | | | | 108/26 |

(Continued)

FOREIGN PATENT DOCUMENTS

| | | | | |
|---|---|---|---|---|
| CA | 2342377 A1 | * | 10/2001 | ............. A47B 37/04 |

OTHER PUBLICATIONS

BeachBUB table tray system with cup holders for beach umbrella sold on amazon dated Mar. 1, 2019, https://www.amazon.com/beachBub-Tray-Table-System-Umbrella/dp/B07P89X15B (Year: 2019).*

(Continued)

*Primary Examiner* — Terrell L McKinnon
*Assistant Examiner* — Ding Y Tan
(74) *Attorney, Agent, or Firm* — Hartman Global IP Law; Gary M. Hartman; Domenica N.S. Hartman

(57) ABSTRACT

Modular tray systems and methods of using the modular tray systems to support a variety of items either in a free-standing orientation or by securing the modular tray system to a chair. Such a modular tray system includes a tray and one or more features for supporting the tray with or from the supporting structure. The tray has a tray member, a base member connected to the tray member, an upper surface, a lower surface, and first and second connecting features defined in, respectively, the tray member and the base member at the lower surface of the tray. The supporting features include at least one of a support rod and a support throne that have third connecting features that are complementary to each of the first and second connecting features of the tray.

20 Claims, 19 Drawing Sheets

(56) References Cited

U.S. PATENT DOCUMENTS

| | | | | |
|---|---|---|---|---|
| 4,861,102 | A * | 8/1989 | Fuller | A47C 7/68 |
| | | | | 297/188.2 |
| D353,742 | S * | 12/1994 | Lewis | D7/552.2 |
| 5,865,124 | A * | 2/1999 | Wroe | A47C 7/70 |
| | | | | 108/157.11 |
| 5,996,511 | A * | 12/1999 | Swoger | A47B 57/26 |
| | | | | 108/151 |
| 6,264,026 | B1 * | 7/2001 | Bradley | A47G 19/065 |
| | | | | 206/217 |
| 6,732,990 | B2 * | 5/2004 | Hudson | B60N 3/103 |
| | | | | 248/548 |
| 6,883,673 | B1 * | 4/2005 | Gourley | A47B 11/00 |
| | | | | 220/4.24 |
| 8,136,458 | B1 * | 3/2012 | Cass | D06F 53/005 |
| | | | | 108/42 |
| 8,381,662 | B2 * | 2/2013 | Goldszer | A47B 37/04 |
| | | | | 135/16 |
| 8,720,349 | B1 * | 5/2014 | David | A47B 37/04 |
| | | | | 211/133.4 |
| 8,979,190 | B2 * | 3/2015 | Madrigal | A47C 7/705 |
| | | | | 297/161 |
| 10,772,435 | B2 * | 9/2020 | Bergin | A47C 7/62 |
| 11,103,095 | B2 * | 8/2021 | Martinez | A47G 23/0641 |
| 11,149,904 | B1 * | 10/2021 | McGuffin | A01K 97/08 |
| D970,972 | S * | 11/2022 | Wang | D12/419 |

| | | | | |
|---|---|---|---|---|
| 2002/0043181 | A1 * | 4/2002 | Gist | A47B 3/12 |
| | | | | 108/26 |
| 2004/0129184 | A1 * | 7/2004 | Kraker | E04H 12/2223 |
| | | | | 108/50.12 |
| 2005/0211742 | A1 * | 9/2005 | Mapes | B25H 3/06 |
| | | | | 224/406 |
| 2006/0236621 | A1 * | 10/2006 | Burns | E04H 15/62 |
| | | | | 52/155 |
| 2014/0131530 | A1 * | 5/2014 | Webb | A47G 23/02 |
| | | | | 248/149 |
| 2016/0270542 | A1 * | 9/2016 | Foster | A47C 7/70 |
| 2017/0086592 | A1 * | 3/2017 | Siverson | A47C 7/624 |
| 2017/0318974 | A1 * | 11/2017 | Bergin | A47C 7/70 |
| 2018/0110329 | A1 * | 4/2018 | Schneider | A47B 3/06 |
| 2019/0053588 | A1 * | 2/2019 | Price | A45B 23/00 |
| 2020/0317107 | A1 * | 10/2020 | Nowak | B60N 3/102 |
| 2022/0281370 | A1 * | 9/2022 | Stubbings | B60N 3/103 |

OTHER PUBLICATIONS

GCI Outdoor Roadtrip Rocker Camping Chair with Armrests, Drink Holder & Comfortable Extended Backrest sold on amazon dated Jan. 28, 2019 (Year: 2019).*

BeachBUB USA 2019 beachBUB how to video posted on Youtube dated 2019, https://www.youtube.com/watch?v=l6tLkePysuM (Year: 2019).*

* cited by examiner

MODULAR TRAY SYSTEMS AND METHODS OF USING

CROSS-REFERENCE TO RELATED APPLICATIONS

This application claims the benefit of U.S. Provisional Application No. 63/394,268 filed Aug. 1, 2022, the contents of which are incorporated herein by reference.

BACKGROUND OF THE INVENTION

The present invention generally relates to modular tray systems adapted to support items, including but not limited to dishes (i.e., plates, bowls, containers), food, beverage containers, and/or non-food items. The invention particularly relates to a modular tray system whose components can be selectively arranged and secured as free-standing or coupled to a variety of different structures to support dishes, food, beverage containers, and/or non-food items in various settings.

Food trays have been proposed that are free standing or mountable to furniture, including tables and chairs. While generally suitable for their intended purposes, such trays are often dedicated to attachment to particular structures having a particular configuration, such as an edge of a table, an arm of a chair, or the back of a chair in stadium, arena, and theater settings. Furthermore, such food trays are often not well suited for outdoor settings, such as in combination with garden or lawn furniture, stadium seats, and other outdoor furniture that are often placed directly on grass, sand, or other natural surface, depending on the outdoor setting.

In view of the above, it can be appreciated that it would be desirable if a tray were available that was capable of being attached to various different structures or free-standing so as to enable the tray to be used in a variety of different settings, including but not limited to outdoor settings.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, modular tray systems and methods of using modular tray systems to support various items by employing a self-supporting structure or securing the modular tray system to a structure in an integral arrangement, especially but not limited to use in outdoor settings.

According to a nonlimiting aspect, a modular tray system is provided that is configured to be mounted to a supporting structure. The modular tray system includes a tray and one or more features for supporting the tray with or from the supporting structure. The tray has a tray member, a base member connected to the tray member, an upper surface, a lower surface, and first and second connecting features defined in, respectively, the tray member and the base member at the lower surface of the tray. The supporting features include at least one of a support rod and a support throne that have third connecting features that are complementary to each of the first and second connecting features of the tray.

Other aspects of the invention include methods of using the modular tray system by supporting the modular tray system with or from the supporting structure.

Other aspects and advantages of this invention will be appreciated from the following detailed description.

DETAILED DESCRIPTION OF THE INVENTION

Figure 1:
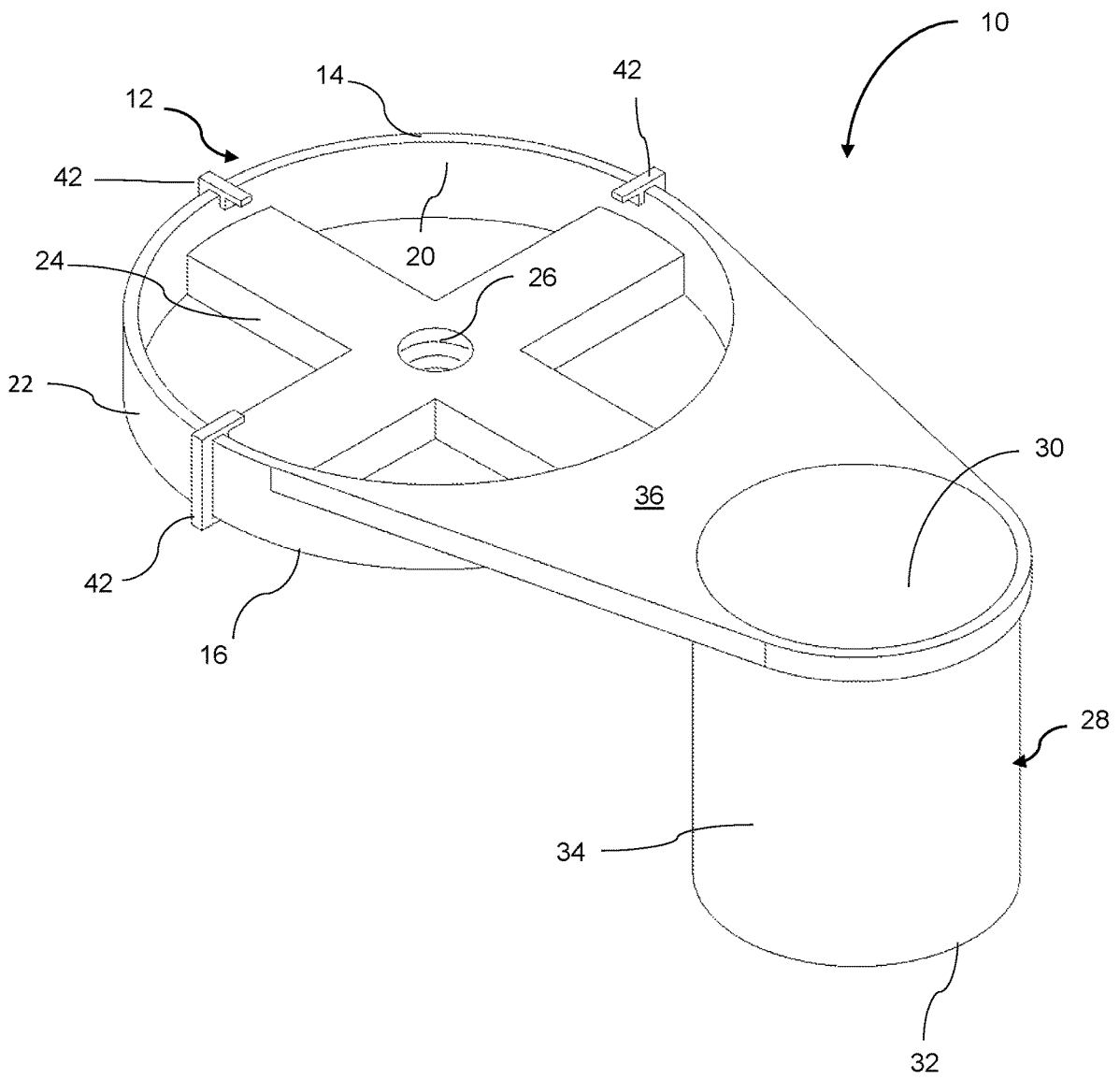
FIG. 1 schematically represents a top perspective view of a tray as one example embodiment of the present invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

The following disclosure describes various aspects of nonlimiting embodiments of modular tray systems and components thereof that are schematically represented in FIGS. 1 through 19. The modular tray systems are represented in different configurations for use in different settings and are capable of utilizing different structures and components from which the modular tray systems can be supported. While the modular tray systems will be described in reference to such structures as tables and chairs that may be of conventional forms, the modular tray systems described herein can be used with a wide variety of structures other than what is described or shown in reference to the drawings.

To facilitate the description provided below of the embodiments represented in the drawings, relative terms, including but not limited to, "proximal," "distal," "vertical," "horizontal," "lateral," "front," "rear," "side," "forward," "rearward," "top," "bottom," "upper," "lower," "above," "below," "right," "left," etc., may be used in reference to an orientation of the modular tray system during its use while mounted to a structure. All such relative terms are intended to indicate the construction and relative orientations of components and features of the modular tray system and therefore are relative terms that are useful to describe the illustrated embodiments and indicate the construction, installation, and use of the modular trays, and in doing so may help to define the scope of the invention.

Figure 2:
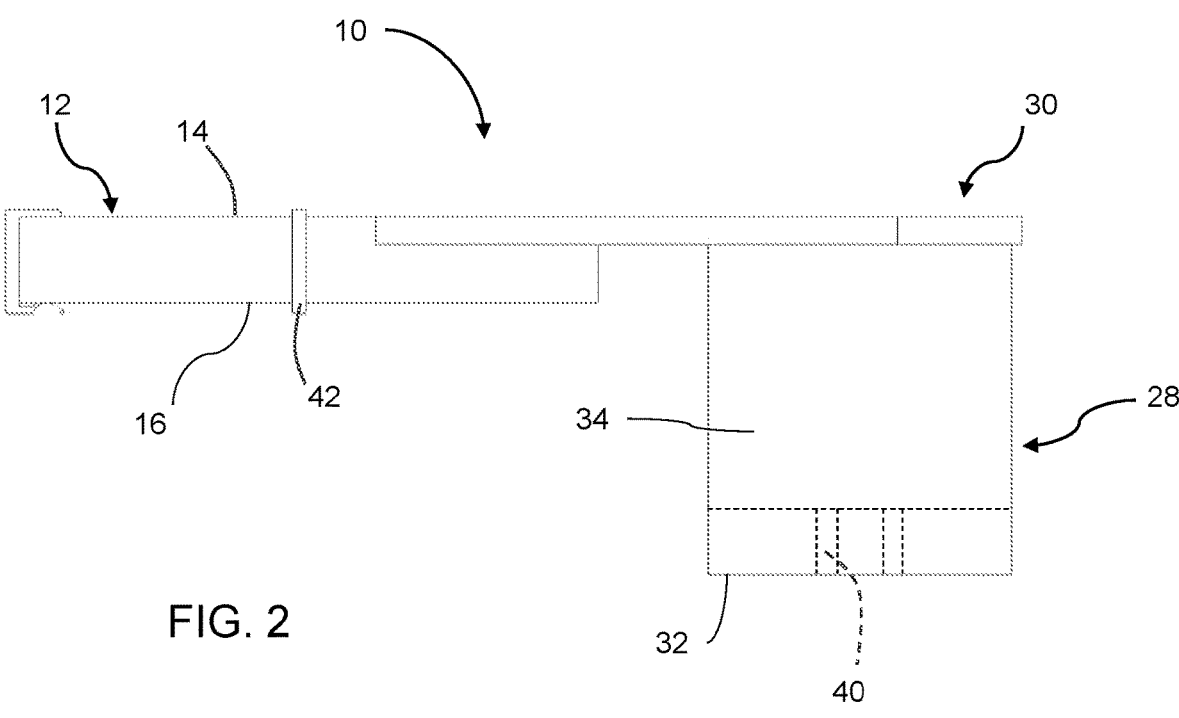
FIG. 2 schematically represents a side view of the tray of FIG. 1.
Figure 3:
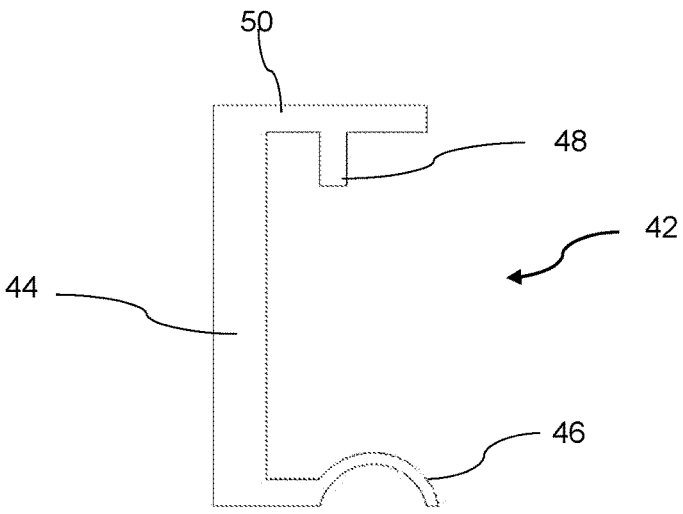
FIG. 3 schematically represents a side view of a retainer clip of the tray of FIG.
Figure 4:
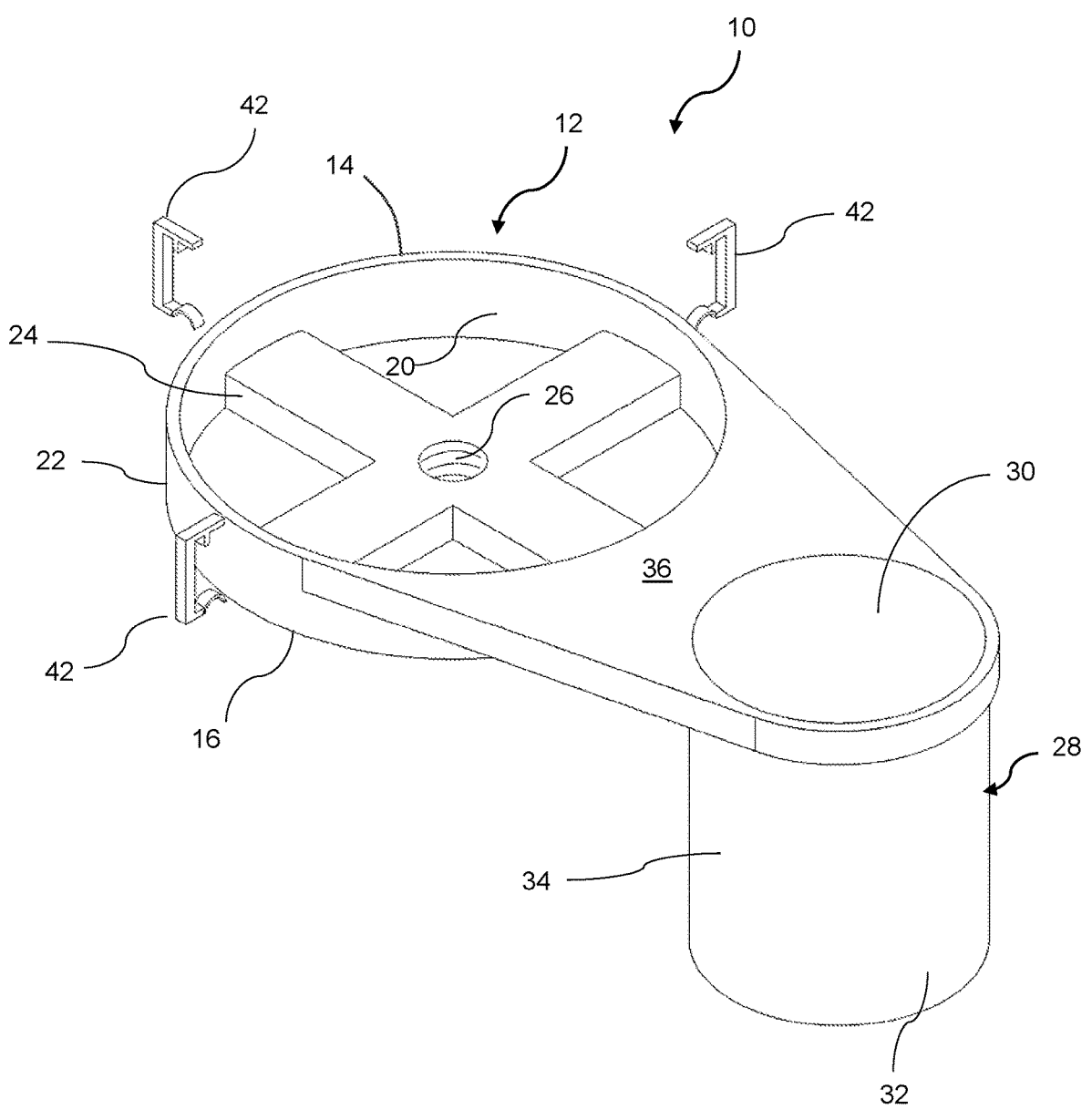
FIG. 4 schematically represents a top perspective view of the tray of FIG. 1 with the retainer clips in positions prior to being installed.
Figure 5:
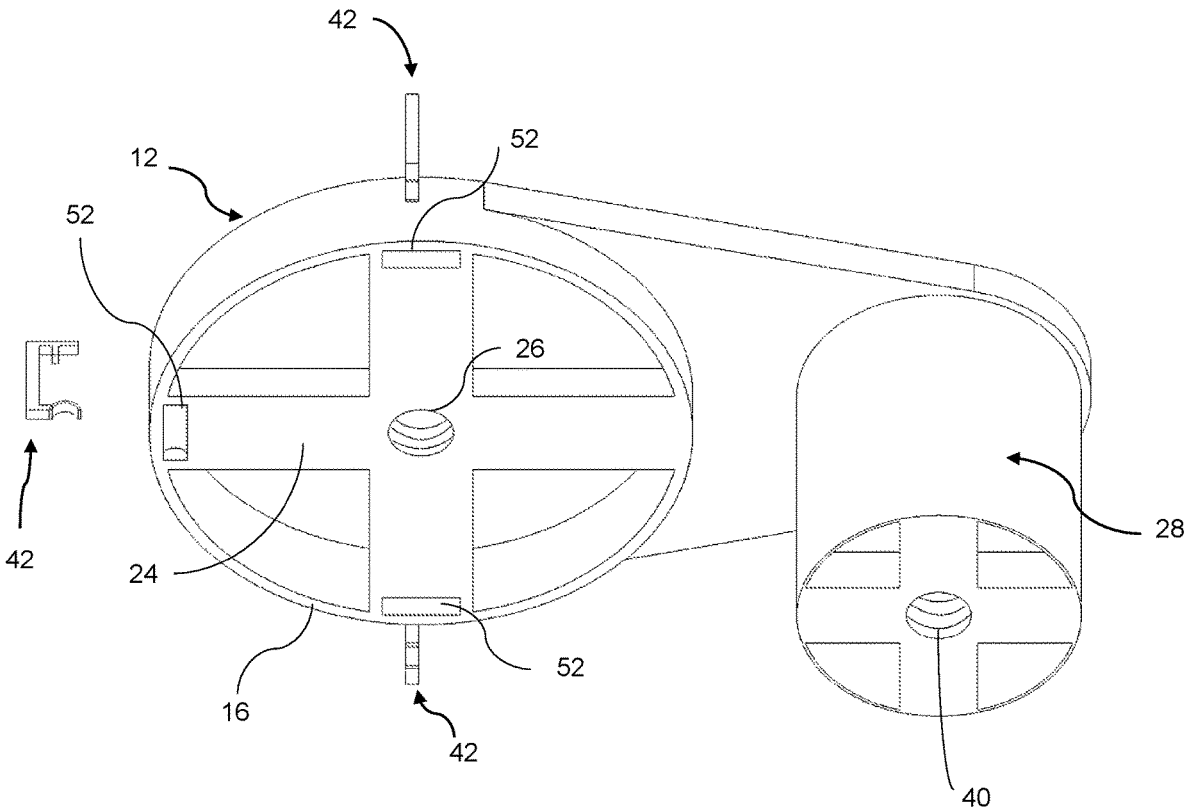
FIG. 5 schematically represents a bottom perspective view of the tray of FIG. 4.

FIGS. 1 through 6 schematically represent an example of a tray 10 and components thereof that are capable of use as a component of a modular tray system of the present invention. The tray 10 includes a tray member 12 that has an upper surface 14 and a lower surface 16. The tray member 12 is depicted as having a cylindrical shape with an inner wall 20 and an outer wall 22. A tray support 24 is disposed within an interior of the tray member 12. The tray support 24 is depicted as generally having an X-shape formed by the intersection of two legs. A first connecting feature 26, depicted as a threaded bore, is disposed at the intersection of the tray support 24 and configured to accept a threaded shaft. The tray 10 also comprises a base member 28 having a tubular shape that defines an upper opening 30, a lower end 32, and a cylindrical wall 34 extending therebetween. The tray member 12 and base member 28 are represented as arranged relative to each other so that the axes of their respective cylindrical/tubular shapes are approximately parallel to each other and the tray member 12 and base member 28 are shown as joined or otherwise connected by a junction 36 arranged transverse and preferably perpendicular to the axes of the tray member 12 and base member 28. As shown in FIG. 2, the base member 28 extends down below the lower surface 16 of the tray member 12. A second connecting feature 40 is shown in FIGS. 2 and 5 as disposed in the lower end 32 of the base member 28.

Figure 6:
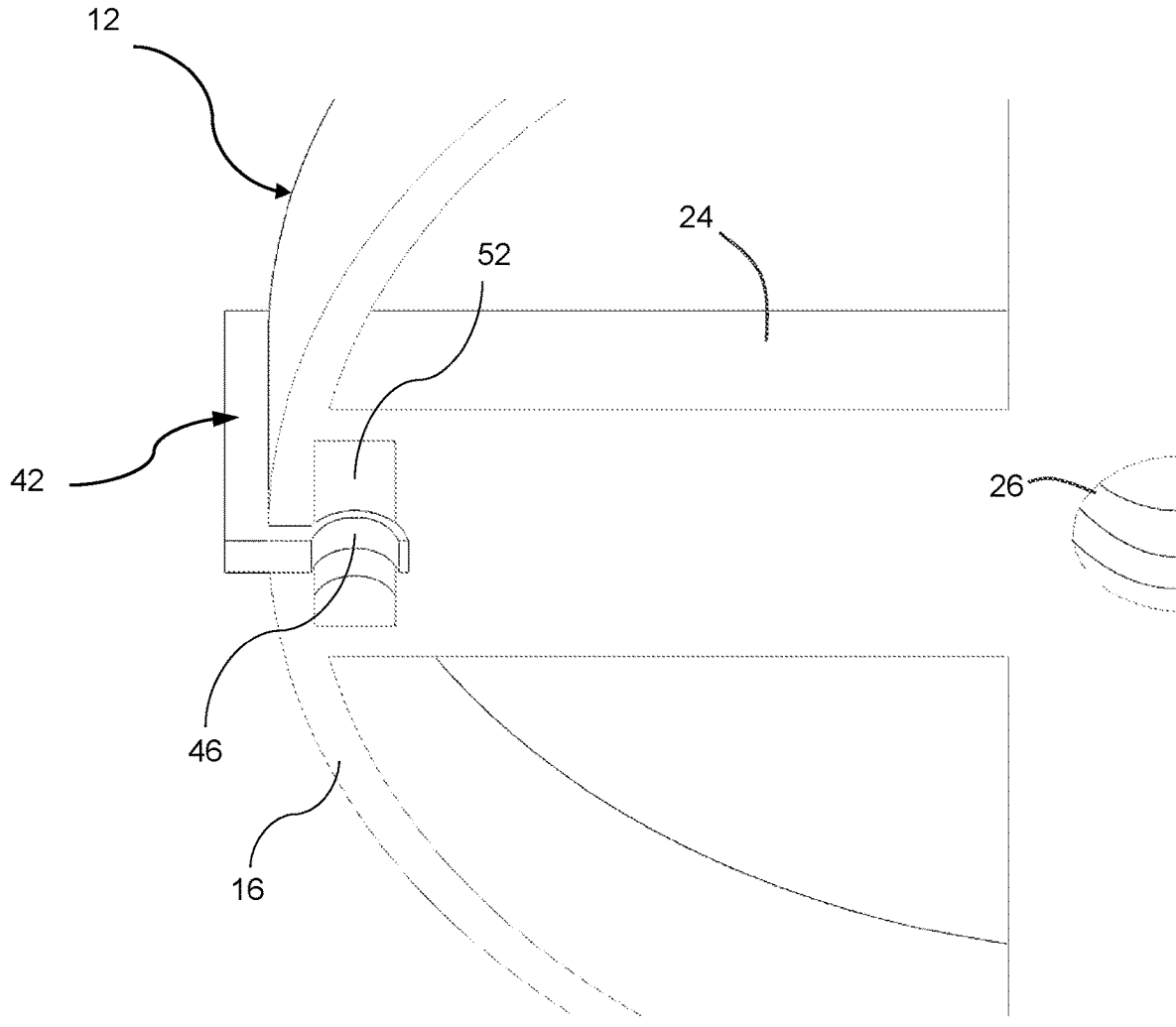
FIG. 6 schematically represents a bottom perspective view showing a detail of the tray of FIG. 1 with the retainer clips installed.

The tray member 12 and the opening 30 in the base member 28 are generally configured to receive and support, respectively, a dishware (such as a plate or bowl) and a beverage container. FIGS. 1, 2, and 6 depict removable clips 42 disposed around and attached to the tray member 12 at the outer wall 22 and engaging the upper and lower surfaces 14 and 16 of the tray member 12, and FIGS. 4 and 5 show the clips 42 detached from the tray member 12. The clips 42 are configured to retain a plate or other dishware (not shown) in contact with the upper surface 14 of the tray member 12, thereby preventing the dishware from being unintentionally dislodged from the tray member 12. FIG. 3 schematically represents an isolated view of a clip 42. The clip 42 includes a body 44, a hook 46, a retention tab 48, and an arm 50. The hook 46 and tab 48 enable the clip 42 to removably engage the tray member 12 of the tray 10. As shown in FIGS. 5 and 6, recesses 52 are located within the lower surface 16 of the tray member 12. FIG. 1 shows the manner in which the retention tab 48 of a clip 42 engages the inner wall 20 of the tray member 12, and FIG. 6 shows the manner in which the hook 46 of a clip 42 engages one of the recesses 52 of the tray member 12.

Figure 7:
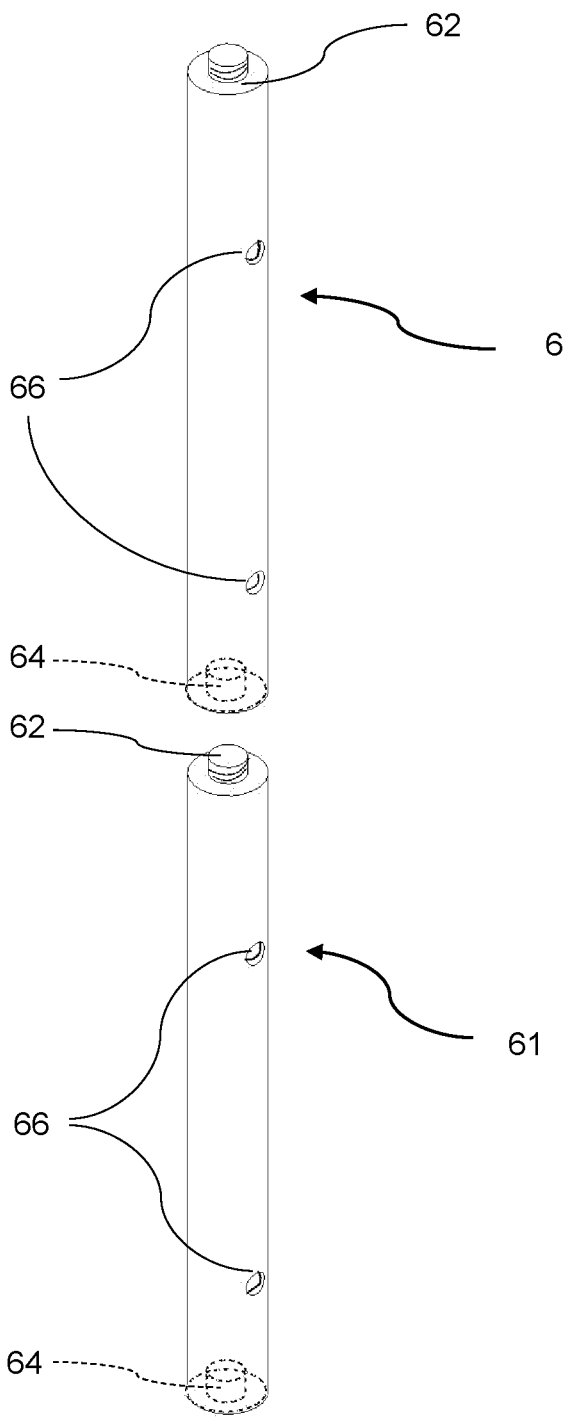
FIG. 7 schematically represents a perspective view of two support rods capable of use in combination with the tray of FIGS. 1 through 6.

FIG. 7 schematically represents two support rods 60 and 61 adapted for use with the tray 10. The support rods 60 and 61 are each shaped as an elongated cylinder with a threaded end 62 and an oppositely-disposed a threaded bore 64 that enable the support rods 60 to be threadably coupled together as well as threadably-coupled to complementarily threaded structures. Openings 66 are located along the elongated cylinder of each support rod 60 and 61. The openings 66 are preferably threaded or otherwise configured to accept a fastener for securing the support rods 60 and 61 to a structure or secure a structure to the support rods 60 and 61, as discussed below. Though two support rods 60 and 61 are depicted, the invention encompasses the use of any number of either or both support rods 60 and 61.

Figures 8A, 8B, 8C:
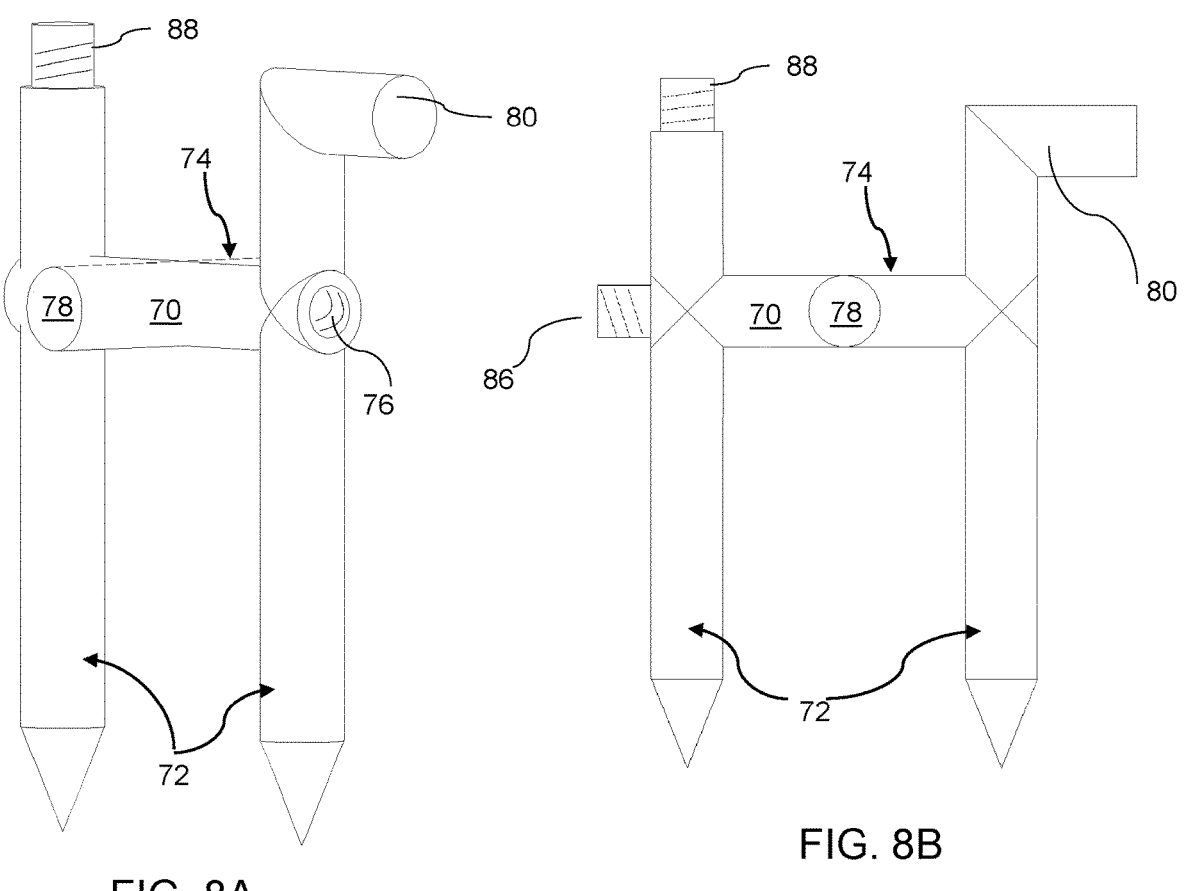
FIGS. 8A and 8B schematically represent side views of a spike capable of use in combination with the tray of FIGS. 1 through 6 and the support rods of FIG. 7.
FIG. 8C schematically represents a top perspective view of a base capable of use in combination with the tray of FIGS. 1 through 6 and the support rods of FIG. 7.

FIGS. 8A-8C depict two different base configurations capable of being assembled to the tray 10 of FIGS. 1 through 6 using one or more of the support rods 60 and 61 of FIG. 7, to result in different modular tray assemblies depicted in FIGS. 9A through 9C and 10A through 10C. FIGS. 8A and 8B depict a base 70 equipped with a threaded connection 88 that enables the base 70 to be threadably coupled to the threaded bore 64 of either support rods 61. The base 70 includes two tines 72 that have conically-shaped lower ends and are connected together by a cross member 74. The tines 72 enable the base 70 to support the modular tray assembly from or with a supporting structure, such as the ground (e.g., soil, sand, or other natural surface) or a manmade structure. For example, the tines 72 may forcibly penetrate or otherwise be inserted into the ground or a manmade structure, such as between boards of a deck as represented in FIG. 11A. Aligned at opposite ends the crossmember 74 are a threaded bore 76 and a threaded stud 86, which as discussed in reference to FIG. 9D can be utilized to interconnect two bases 70 to each other. Stops 78 extend perpendicularly from the cross member 74 in opposite directions for use as anti-tipping features, as will be discussed in reference to FIG. 11A. A handle 80 extends upwards from an upper end of one of the tines 72, and the threaded connection 88 is disposed at an upper end of the other tine 72.

Figure 11A:
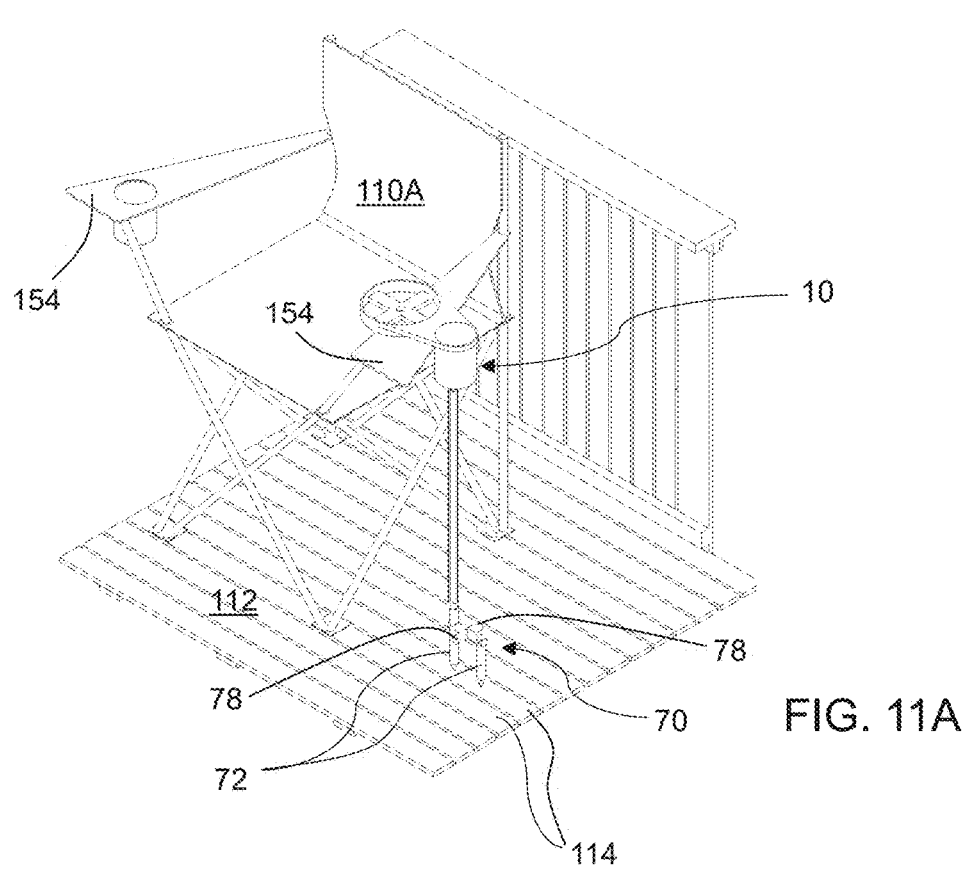
FIG. 11A schematically represents a perspective view of the modular tray system of FIG. 9B used in combination with a chair equipped with armrests.
Figure 11B:
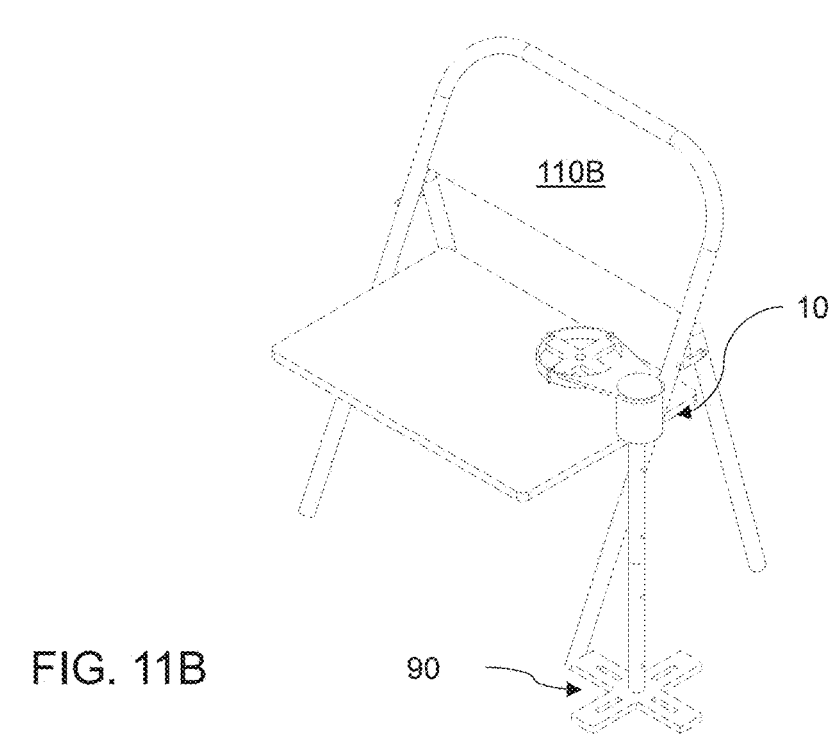
FIG. 11B schematically represents a perspective view of the modular tray system of FIG. 10B used in combination with a chair lacking an armrest.

FIG. 8C schematically represents a second base 90 that lacks tines and yet is capable of supporting the modular tray assembly above and with a supporting structure, such as the ground (e.g., soil, sand, or other natural surface) or a manmade structure as represented in FIG. 11B. The base 90 includes cross supports 94 that define a top surface 97 and a bottom surface of the base 90 that is adapted to be supported by a natural or manmade surface, for example, a floor, deck, concrete, natural surface such as soil or sand, etc., beneath the base 90. The cross supports 94 intersect at a center of the base 90 where a threaded stud 92 is located. Each of the cross supports 94 is shown as including an opening 96 that extends entirely through the support 94. The base 90 optionally includes bars 98 equipped with lower extensions 100 that are sized and configured to fit snugly within the openings 96 in the base 90, extend through the openings 96, and protrude below the bottom surface of the base 90. The bars 98 are configured to close the openings 96, and the extensions 100 of the bars 98 are preferably sized to penetrate the ground (e.g., soil, sand, or other natural surface) beneath the base 90. Alternatively, the bars 98 may be omitted or not installed to allow for the openings 96 to remain open, as may be desirable if the base 90 is immersed in sand during use of the modular tray assembly with which it is assembled.

Figures 9A, 9B, 9C, 9D:
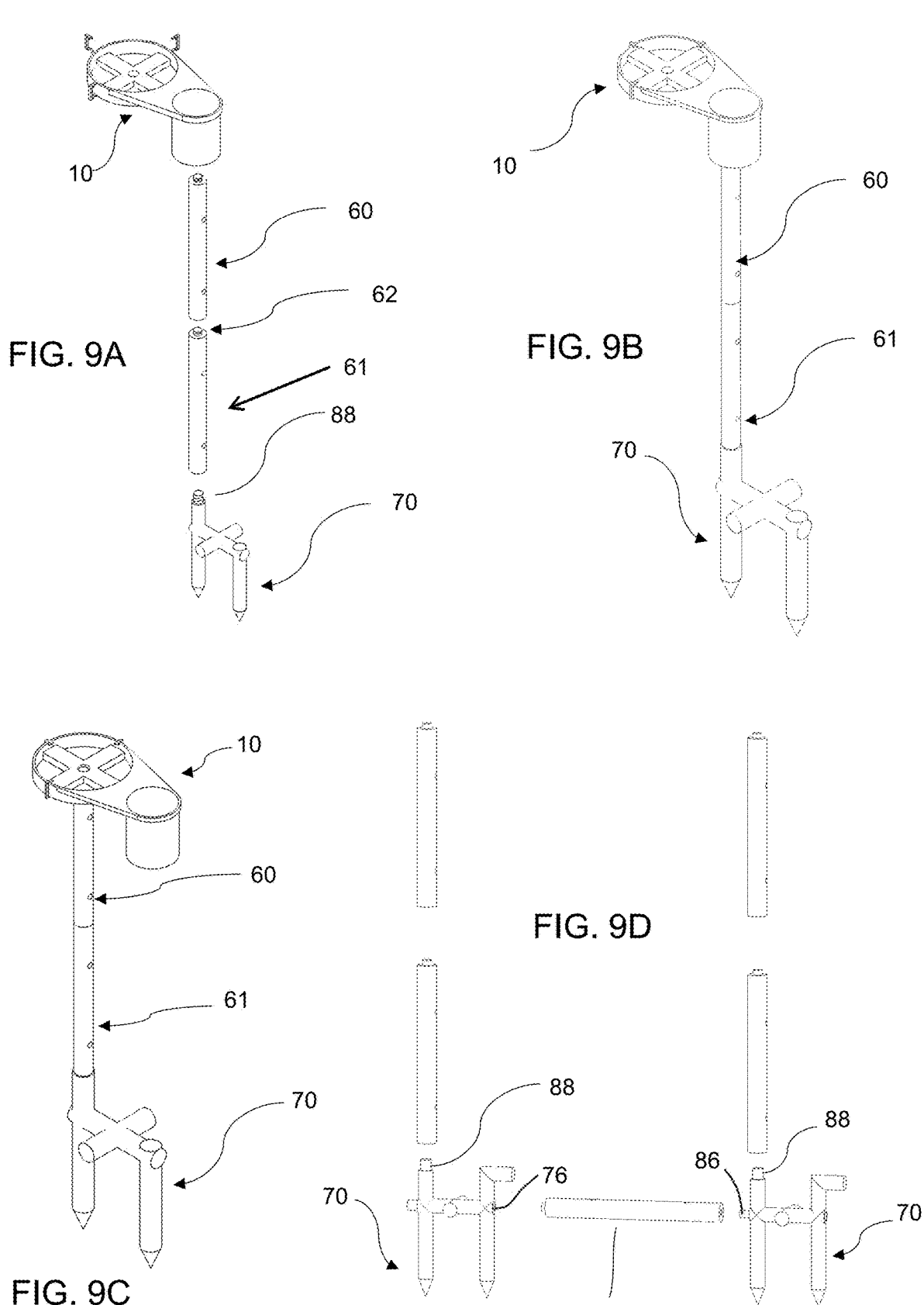
FIG. 9A schematically represents an exploded perspective view of a modular tray system utilizing the tray of FIGS. 1 through 6, the support rods of FIG. 7, and the spike of FIGS. 8A-8B.
FIGS. 9B and 9C schematically represent assembled perspective views showing two different arrangements of the modular tray system of FIG. 9A.
FIG. 9D schematically represents a perspective view of an assembly comprising two sets of the support rods of FIG. 7, two sets of the spike of FIGS. 8A-8B, and a joiner bar 68 for providing a connection therebetween.

FIGS. 9A-9C depict alternate embodiments of modular tray systems utilizing the base 70 of FIGS. 8A and 8B. FIGS. 9A and 9B represent a configuration in which the two support rods 60 and 61 are threadably connected to each other with their respective complementary threaded ends 62 and bores 64, and the upper support rod 60 is threadably connected to the connecting feature 40 formed in the base member 28 of the tray 10 via the threaded end 62 of the upper support rod 60. The base 70 is fastened to the lower support rod 61 by threading the threaded connection 88 of the base 70 into the threaded bore 64 of the support rod 61.

FIG. 9C schematically represents an alternative modular tray assembly that differs from that of FIGS. 9A and 9B as a result of the threaded end 62 of the upper support rod 60 being threadably connected to the connecting feature 26 formed in the tray support 24 of the tray 10.

FIG. 9D schematically represents an alternative configuration in which two of the base 70 are connected together by a joiner bar 68. The joiner bar 68 is threadably connected to the threaded stud 86 of one base 70 and to the threaded bore 76 of the second base 70. In this manner, two trays 10 can be separately mounted to one or more support rods 60 and/or 61 separately assembled to each of the bases 70.

Figures 10A, 10B, 10C:
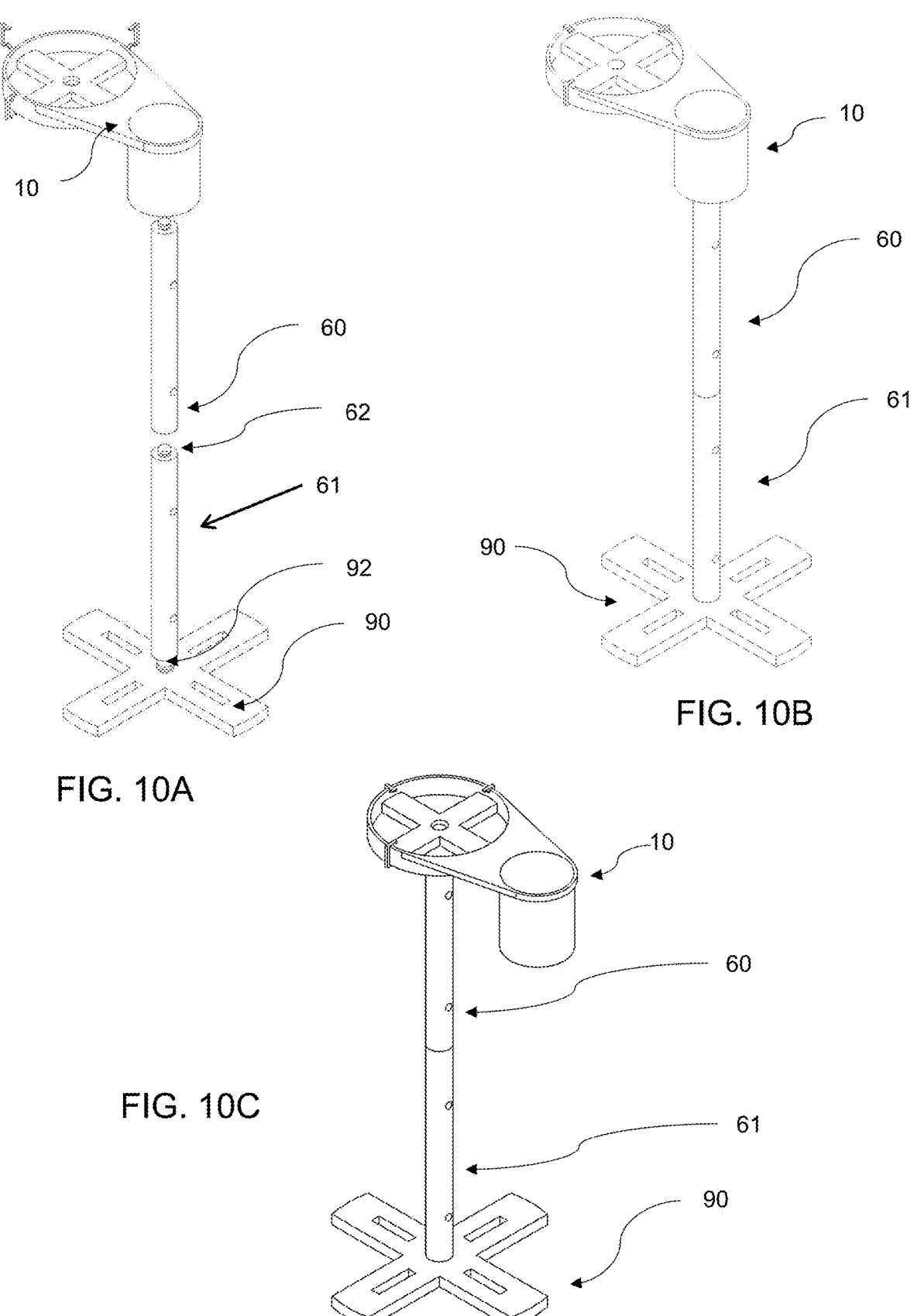
FIG. 10A schematically represents an exploded perspective view of a modular tray system utilizing the tray of FIGS. 1 through 6, the support rods of FIG. 7, and the base of FIG. 8C.
FIGS. 10B and 10C schematically represent assembled perspective views showing two different arrangements of the modular tray system of FIG. 10A.

FIGS. 10A-10C represents modular tray assemblies that are similar to those of FIGS. 9A-9C, but utilize the flat base 90 of FIG. 8C instead of the tined base 70 of FIGS. 8A and 8B. As in FIGS. 9A and 9B, the upper support rod 60 is connected to the base member 28 of the tray 10 via the threaded end 62 thereof being threaded into the connecting feature 40, the lower support rod 61 is connected to the upper support rod 60 by way of the threaded end 62 of the lower support rod 61 being threaded into the threaded bore 64 of the upper support rod 60, and the threaded stud 92 of the base 90 being threaded into the threaded bore 64 of the lower support rod 61. FIG. 10C schematically represents an alternative configuration corresponding to FIG. 9C, differing from that of FIGS. 10A and 10B as a result of the threaded end 62 of the upper support rod 60 being threadably connected to the connecting feature 26 formed in the tray support 24 of the tray 10.

FIG. 11A schematically represents the modular tray assembly of FIGS. 9A and 9B used in combination with a chair 110A sitting on a deck 112. As shown, the tines 72 of the base 70 of the modular tray system are configured to be inserted between deck boards 114 and held in a vertical orientation by engaging stops 78 of the base 70 with the upper surfaces of the deck 112 as a result of the stops 78 acting together as an anti-tipping feature to prevent the modular tray system from tipping over. The base 70 is contemplated to be used with decks as well as with grass or soil foundations. FIG. 11B schematically represents the modular tray assembly of FIGS. 10A and 10B placed next to a chair 110B and utilizing the flat base 90 to support the modular tray system in a vertical orientation.

Figure 12:
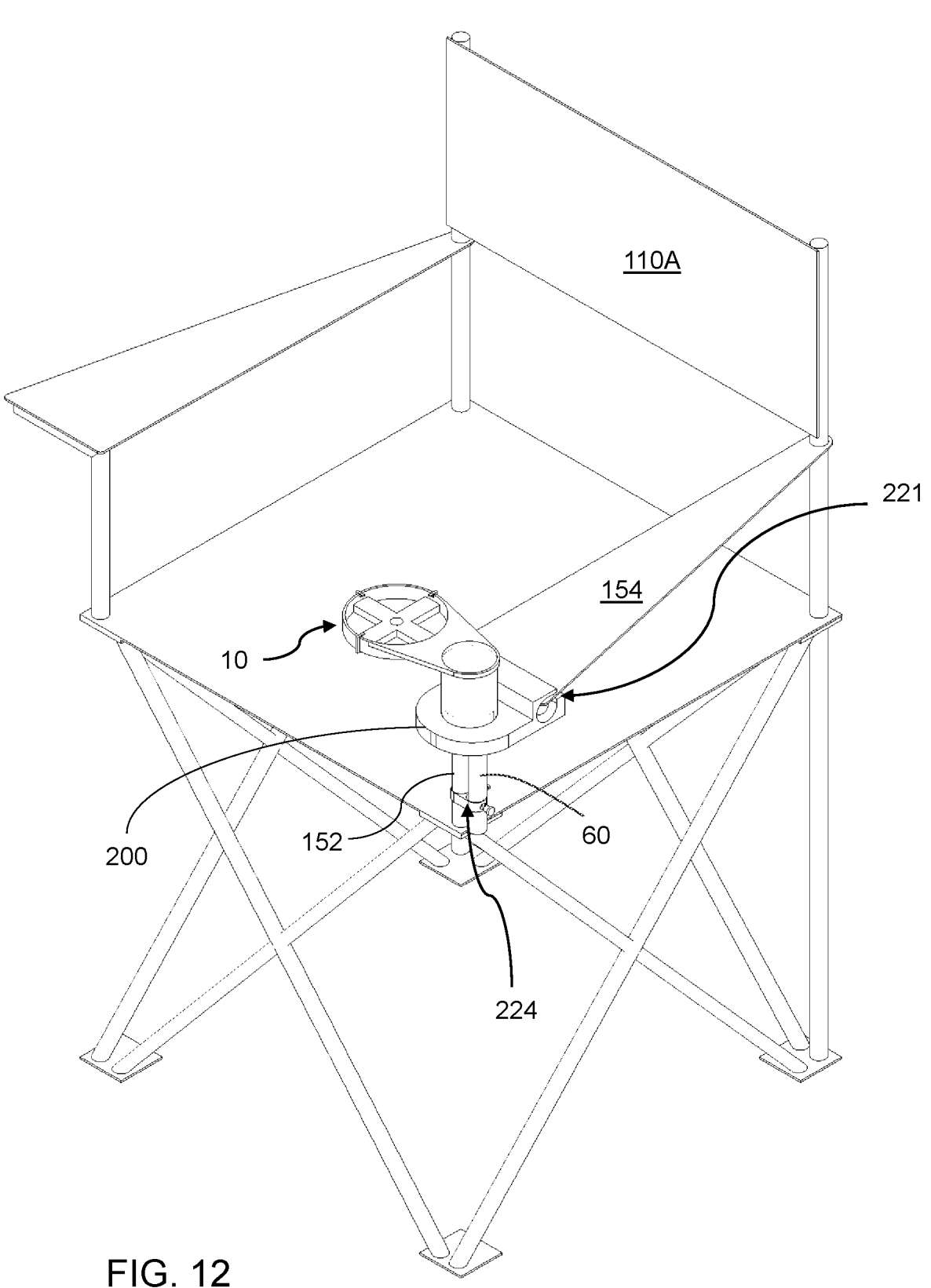
FIG. 12 schematically represents a perspective view of another modular tray system that utilizes the tray of FIGS. 1 through 6 and mounted to an armrest of a chair.

The chairs 110A and 110B of FIGS. 11A and 11B differ from each other as a result of the chair 110A being equipped with armrests 154 and the chair 110B lacking armrests. The armrests 154 of the chair 110A offer additional methods by which a modular tray assembly can be used in combination with the chair 110B. Such a method is represented in FIG. 12, in which the tray 10 is supported by a support throne 200, shown in isolation in FIGS. 14 and 15A-15D. In FIG. 12, one of the support rods 60 is shown attached to a lower surface 206 of the support throne 200.

Figure 16A:
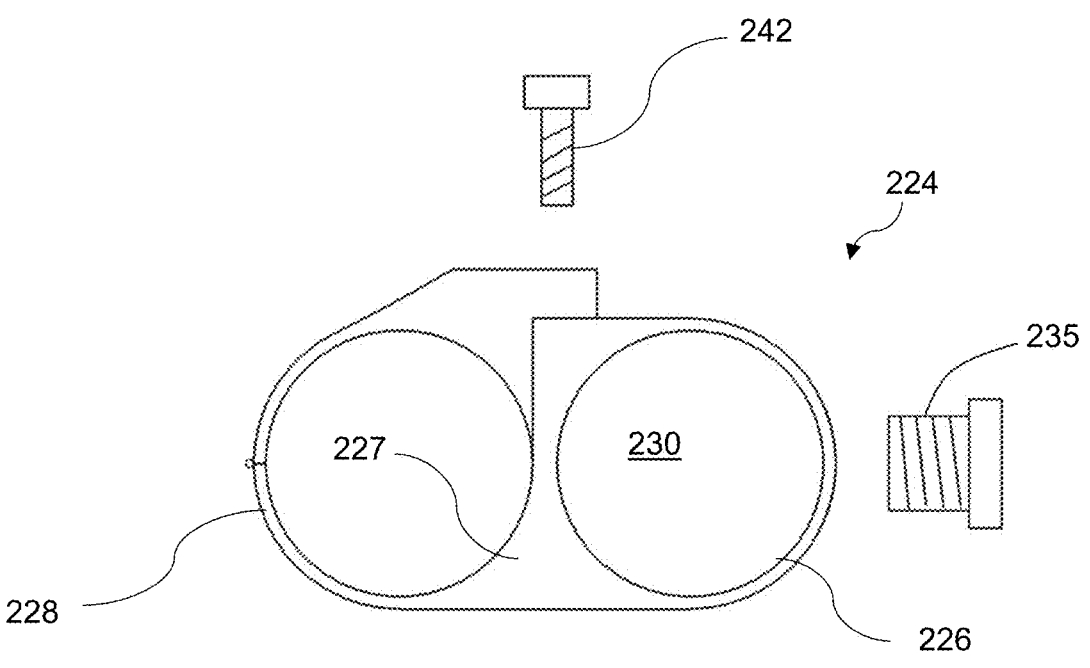
FIG. 16A schematically represents a top perspective view of a coupler of the modular tray system of FIGS. 12 and 13, wherein the coupler is shown in a closed position.
Figure 16B:
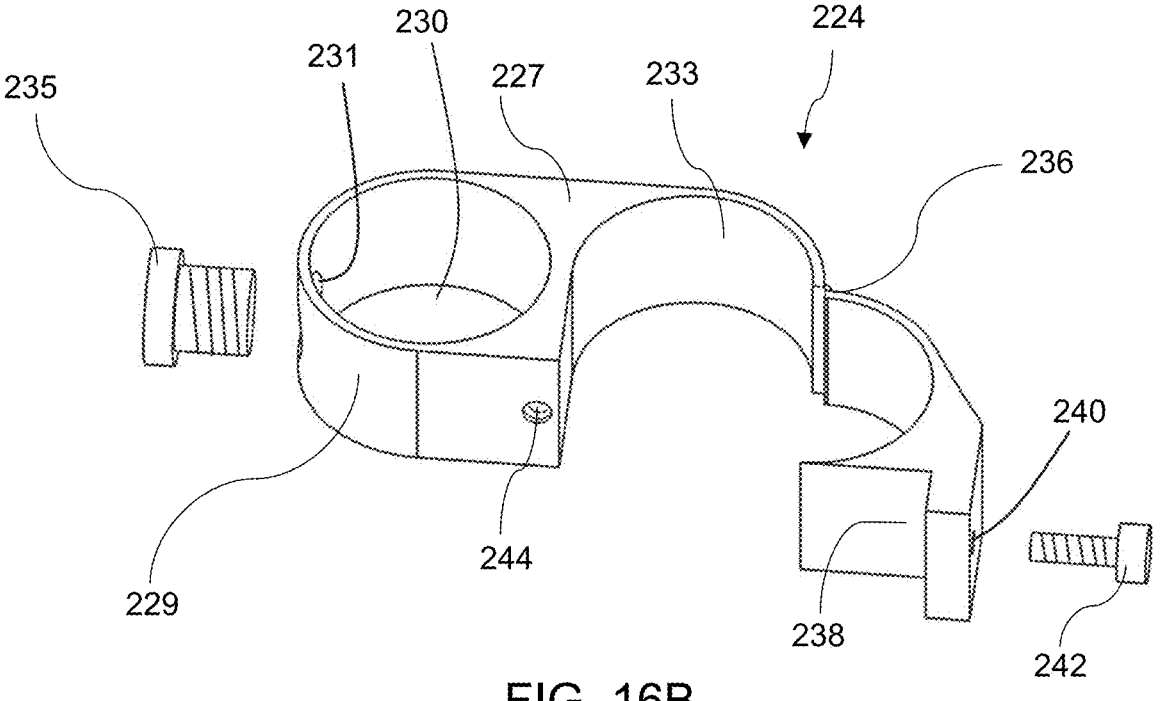
FIG. 16B schematically represents a perspective view of the coupler of FIG. 16A in an open position thereof.

Couplers 224 are configured to be attached to the support rod 60 and to a vertical support member 152 of an armrest 154 of the chair 110A (FIG. 12). FIGS. 16A and 16B depict one of the couplers 224 as including a body 227 having a first cylindrical portion 226 and a second cylindrical portion 228. The first cylindrical portion 226 is closed and defines an opening 230 therethrough that is configured to accept the support rod 60 therein. A side wall 229 of the cylindrical portion 226 includes a threaded hole 231 for accepting a fastener 235, by which the coupler 224 can be secured to the support rod 60. The second cylindrical portion 228 defines a cradle 233 that is fixed and adjacent the body 227. A hinge 236 connects an arm 238 of the cylindrical portion 228 to the cradle 233. The arm 238 includes an opening 240 that is configured to accept a fastener 242 that can be threaded into a threaded opening 244 in the body 227 of the coupler 224.

Figure 19:
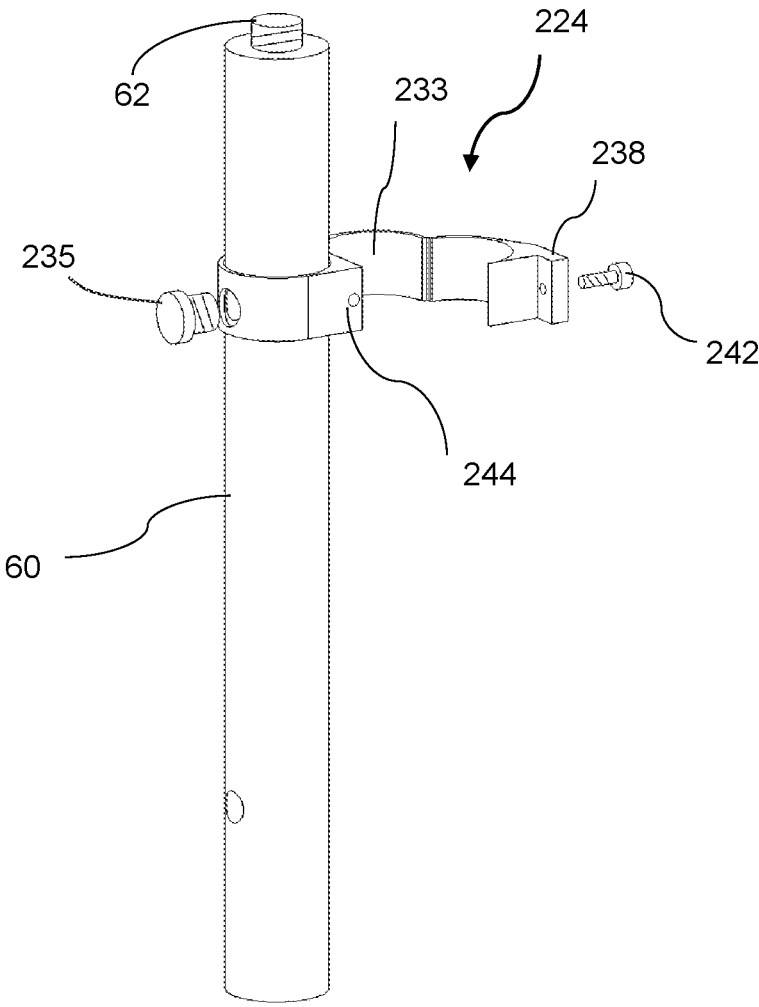
FIG. 19 schematically represents an isolated view of the support rod and coupler of FIG. 15 with the coupler shown in the open position thereof.

FIG. 19 schematically represents the coupler 224 mounted to the support rod and the arm 238 of the coupler 224 in an open position for attaching the coupler 224 (and therefore the support rod 60) to the support member 152 of the chair 110A. With the arm 238 of the coupler 224 in its open position, the cradle 233 is exposed to allow the support member 152 of the armrest 154 to be inserted therein. Closing the arm 238 and securing the arm 238 in a closed position with the fastener 242 threaded into the opening 244 of the coupler 224 serves to secure the support rod 60 to the support member 152 of the chair 110B. Because the cylindrical portion 226 lacks a hinge, the coupler 224 is assembled with the support rod 60 by passing the rod 60 through the opening 230.

Figure 13:
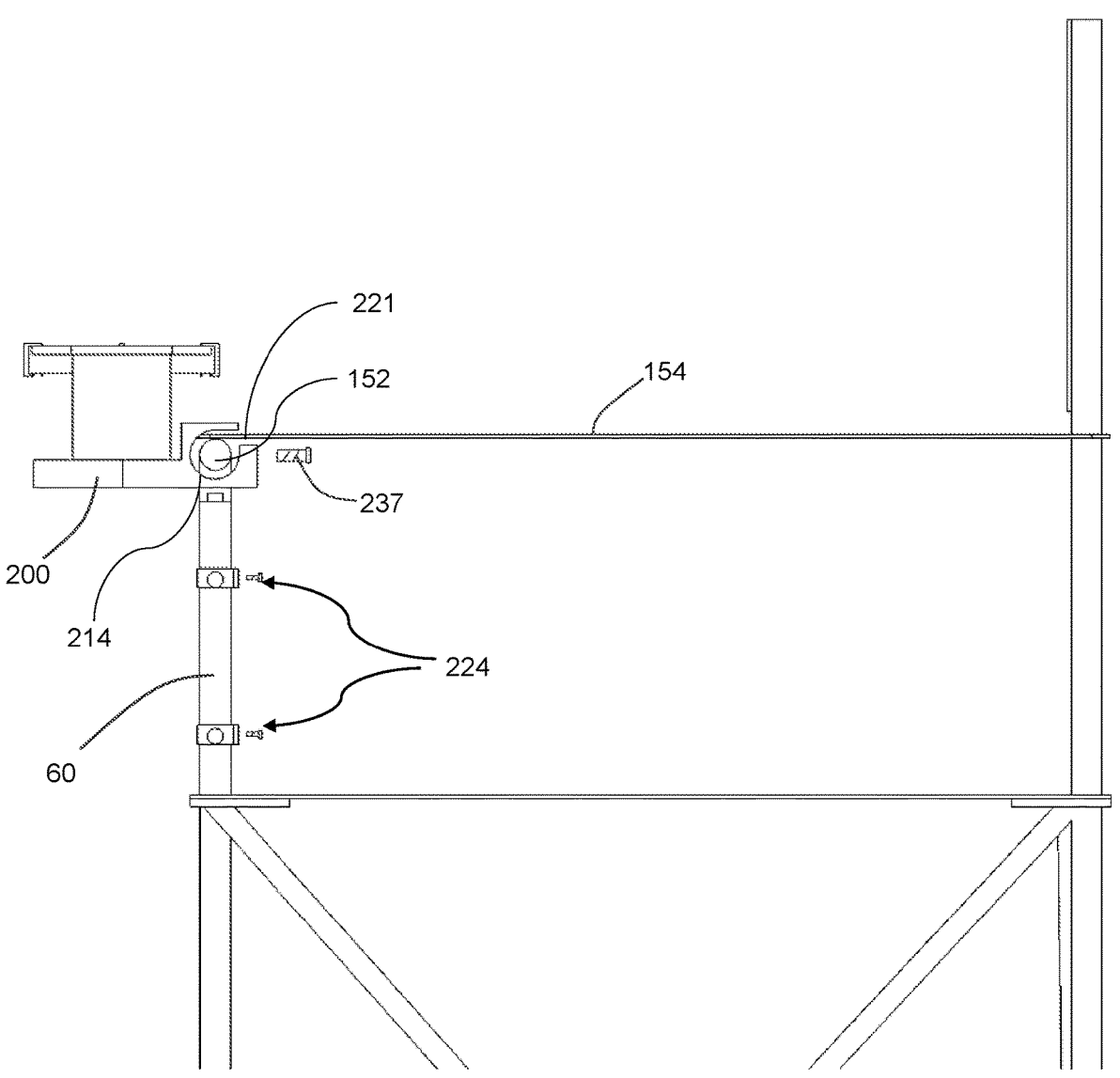
FIG. 13 schematically represents a side view of the modular tray system of FIG. 12.
Figure 14:
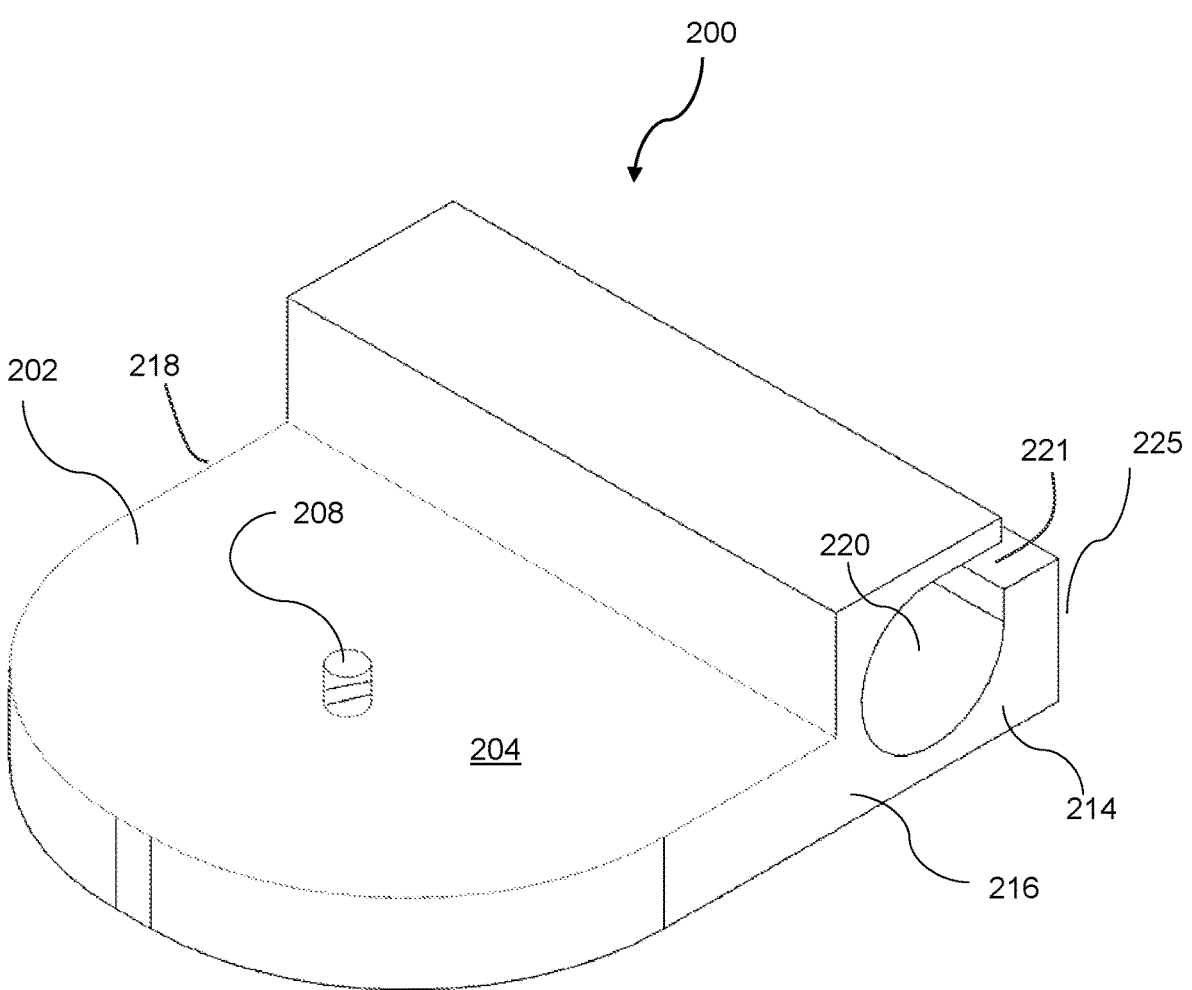
FIG. 14 schematically represents a perspective view of a support throne of the modular tray system of FIGS. 12 and 13.

FIGS. 12 and 13 depict the tray 10 mounted to the chair 110A with the support throne 200. The support throne 200 is represented in FIG. 13 as engaged with the armrest 154 of the chair 110A. A flexible portion of the armrest 154 extends through a slot 221 of the support throne 200 and a portion of the arm support 152 resides within a bore 220 of a clamping unit 214 of the throne 200. FIG. 13 schematically represents fasteners 237 in position to be inserted into threaded bores 239 in the clamping unit 214 of the support throne 200 to additionally secure the tray 10, and therefore the entire modular tray system, to the armrest 154 of the chair 110A.

Figures 15A, 15B:
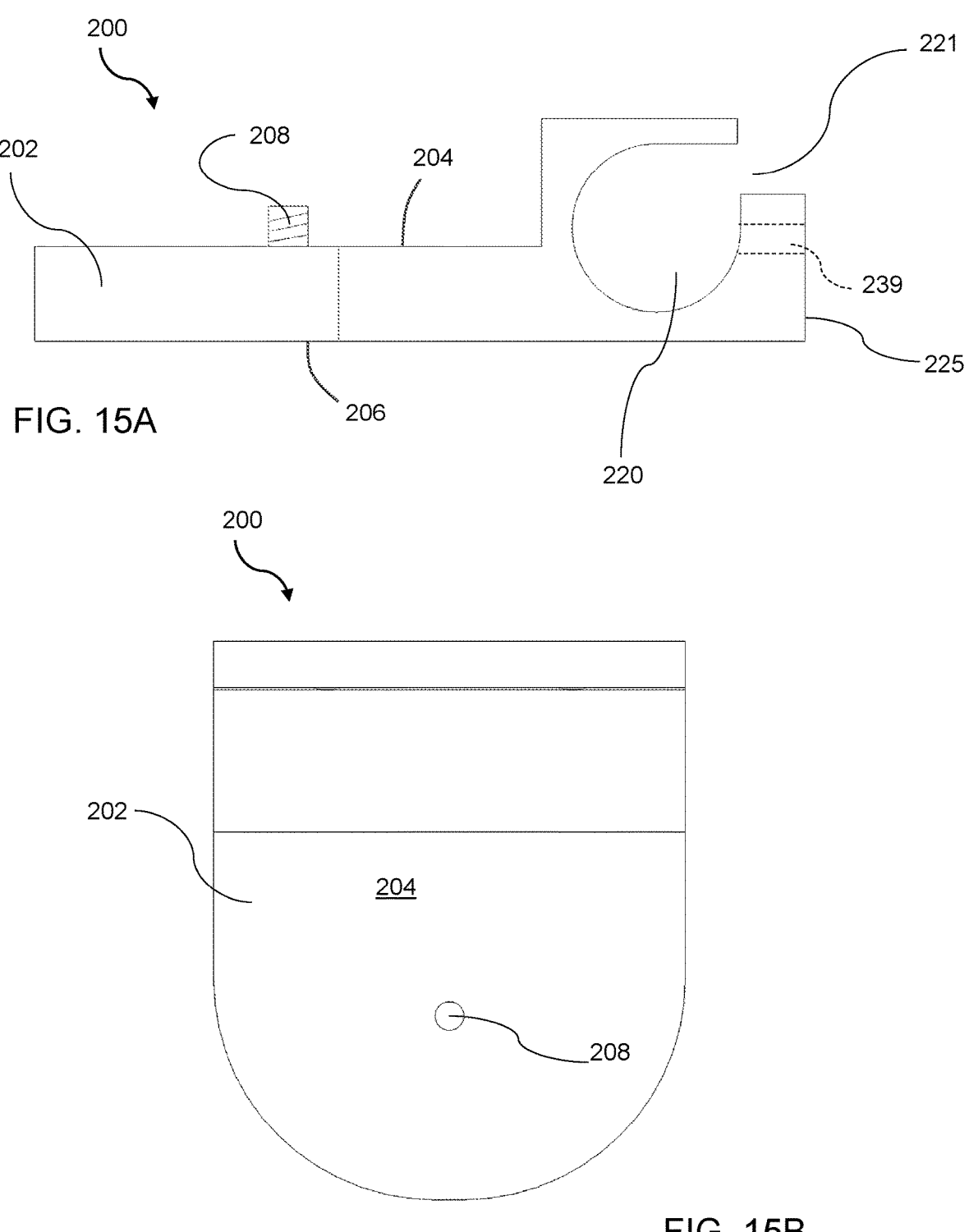
FIGS. 15A-15D schematically represent side, top, end, and bottom views respectfully, of the support throne of FIG. 14.
Figure 15C:
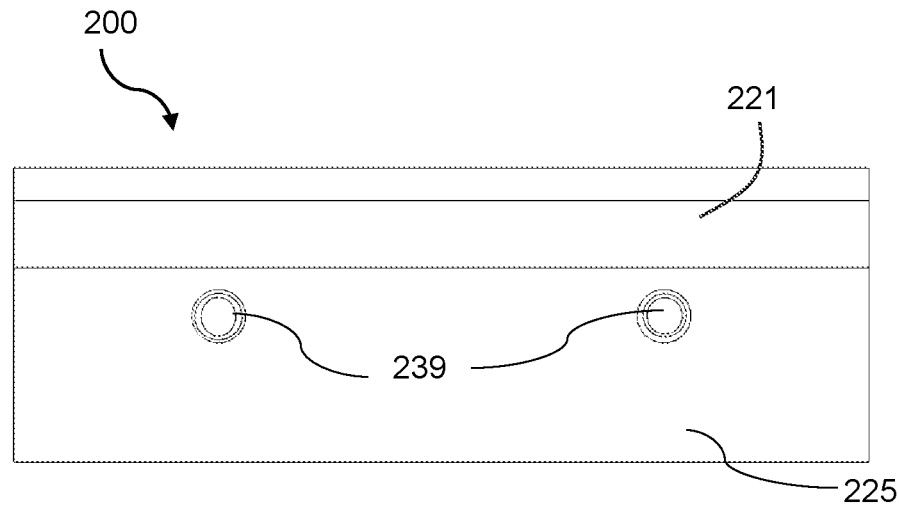
Figure 15D:
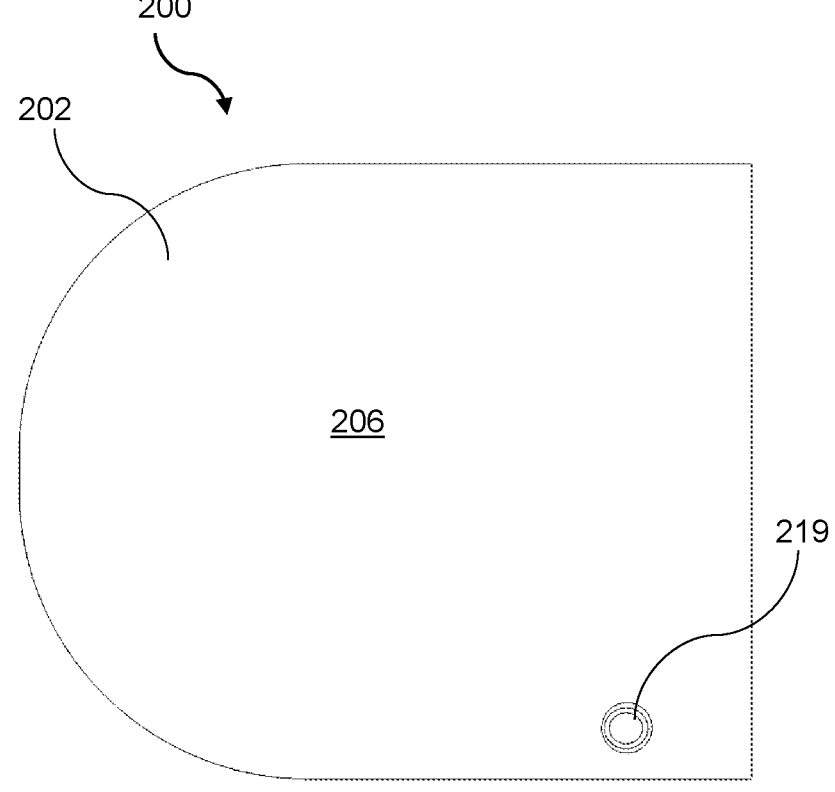

FIGS. 14 and 15A-15D depict the support throne 200 as including a tray support 202 with an upper surface 204 and a lower surface 206. Additionally, a tray connector 208 is shown protruding from the upper surface 204. In the embodiment shown, the tray connector 208 is a threaded stud that is configured to threadably connect to the tray 10 using either of its connecting features 26 and 40. The clamping unit 214 is adjacent the tray support 202 and represented as including a first side 216 and a second side 218. The aforementioned bore 220 extends between the first side 216 and second side 218, and the slot 221 extends from a back side 225 of the throne 200 through the clamping unit 214 and into the bore 220 and runs the entire width of the bore 220 (FIG. 15C). As can be seen in FIGS. 15A and 15C, the threaded bores 239 extend from the back side 225 and into the bore 220. FIGS. 15C and 15D provide additional perspectives of the support throne 200. FIG. 15D schematically represents the lower surface 206 of the tray support 202 and the clamping unit 214. A threaded bore 219 is formed in the lower surface 206 of the throne 200 that is sized to accept the threaded end 62 of the support rod 60.

Figure 17:
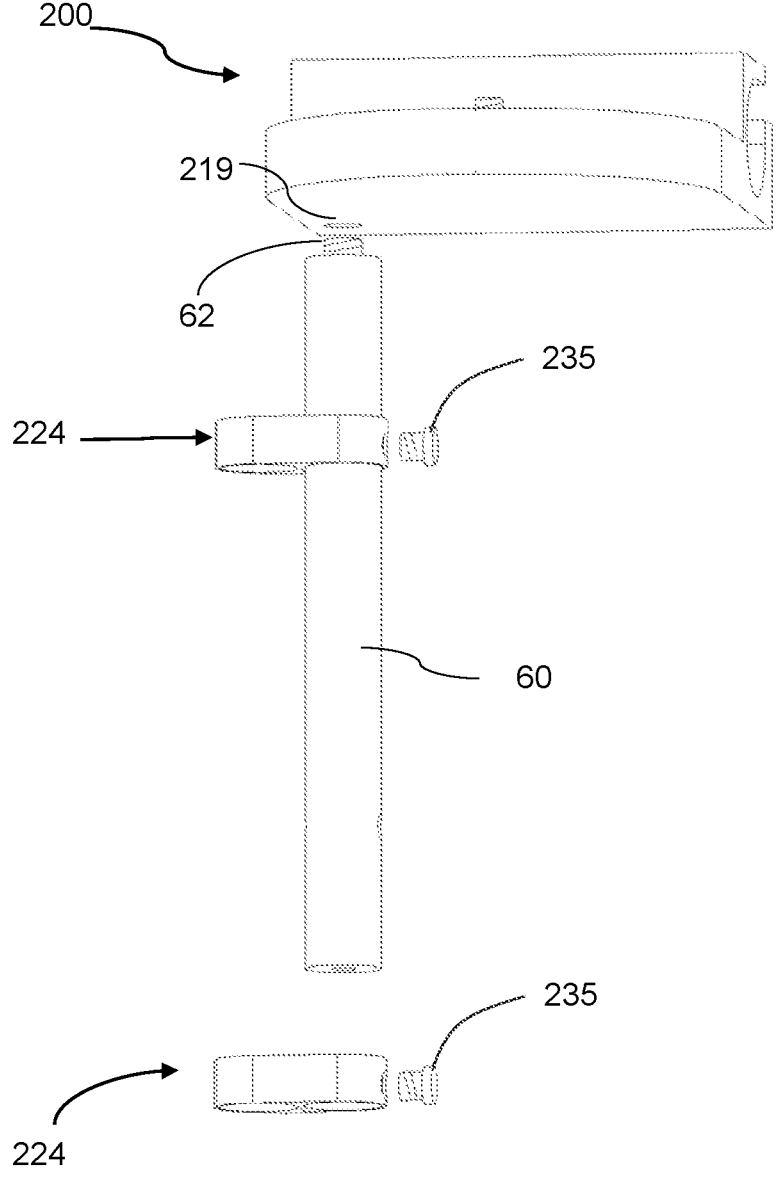
FIG. 17 schematically represents an exploded bottom perspective view showing in isolation the support throne of FIG. 14, a support rod of FIG. 7, and the coupler of FIGS. 16A and 16B.
Figure 18:
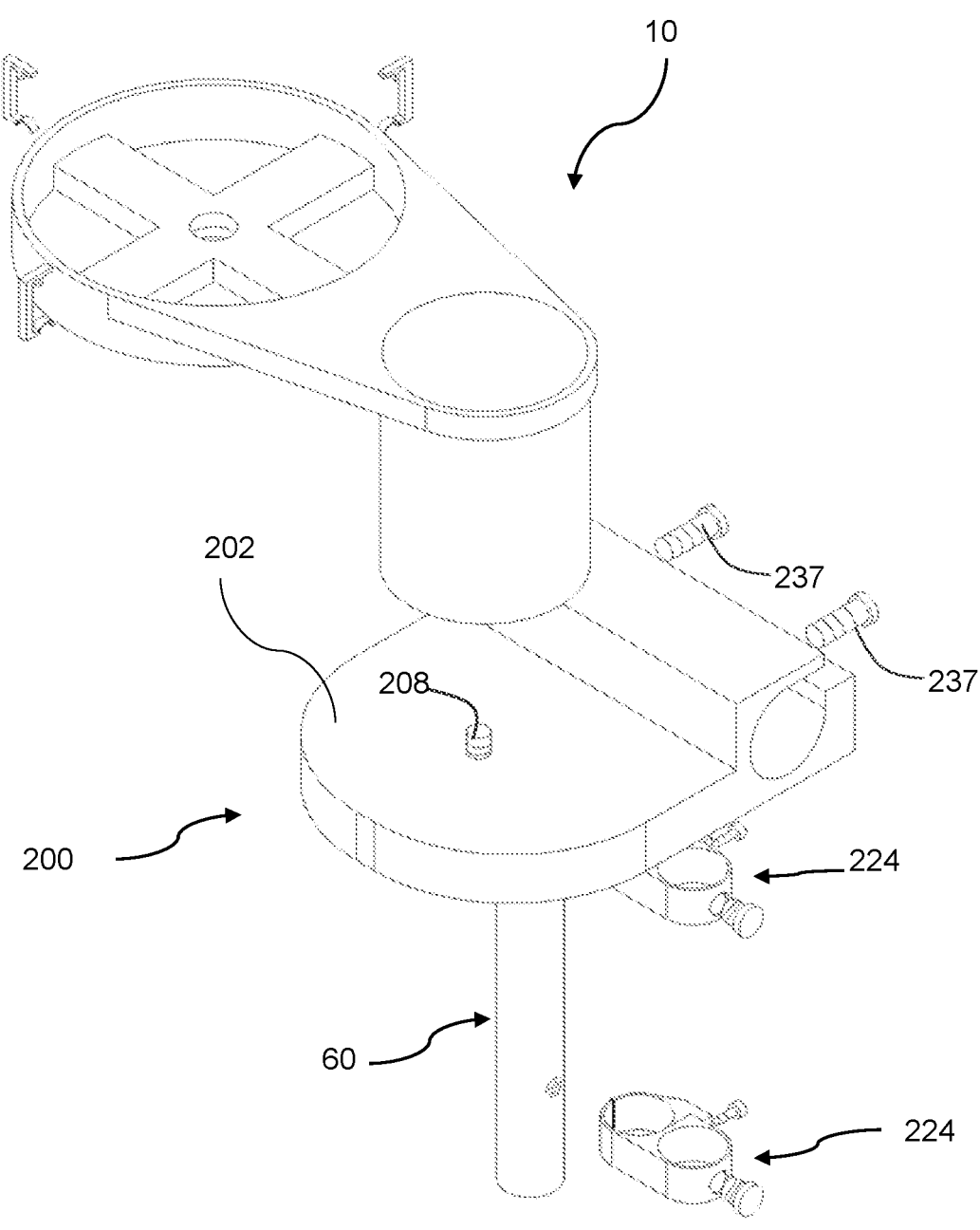
FIG. 18 schematically represents an exploded top perspective view of the modular tray system of FIGS. 12 and 13.

FIG. 17 schematically represents the support rod 60 in an orientation to be connected to the support throne 200. As can be seen, the threaded end 62 is aligned to engage the threaded bore 219 on the lower surface 206 of the support throne 200. FIG. 17 also schematically represents the coupler 224 in an installed position on the support rod 60. The threaded hole 231 of the coupler 224 is aligned with the upper opening 66 of the support rod 60. A second coupler 224 is positioned below the support rod 60 and configured to be installed on the support rod 60 by inserting the support rod 60 into the cylindrical opening 226 of the coupler 224.

As previously noted above, though the foregoing detailed description describes certain aspects of one or more particular embodiments of the invention, alternatives could be adopted by one skilled in the art. For example, the modular tray system and its components could differ in appearance from the embodiments described herein and shown in the drawings, and functions of certain components of the modular tray system could be performed by components of different construction but capable of a similar (though not necessarily equivalent) function. As such, and again as was previously noted, it should be understood that the invention is not necessarily limited to any particular embodiment described herein or illustrated in the drawings.

The invention claimed is:

1. A modular tray system configured to be supported with a variety of different supporting structures, the modular tray system comprising:

a tray having a tray member, a base member connected to the tray member, an upper surface, a lower surface, and first and second connecting features defined in, respectively, the tray member and the base member at the lower surface of the tray; and means for supporting the tray with the different supporting structures, the supporting means comprising at least a first support rod and a support throne, the first support rod having a third connecting feature that is complementary to either one of the first and second connecting features of the tray member and the base member, respectively, and the support throne having a third connecting feature that is complementary to either one of the first and second connecting features of the tray member and the base member, respectively, so that the tray is configured to be coupled to and supported with the first support rod or with the support throne;

wherein the first support rod comprises a base configured to support the tray in a free-standing orientation from and above a first supporting structure of the different supporting structures, and the support throne is configured to support the tray from an armrest of a chair as a second supporting structure of the different supporting structures.

2. The modular tray system of claim 1, further comprising clips adapted to secure an object to the upper surface of the tray.

3. The modular tray system of claim 1, further comprising an upper opening in the base member for receiving a beverage container.

4. The modular tray system of claim 1, wherein the supporting means further comprises a first base with tines and a second base that lacks tines and instead has cross supports, and the first and second bases are adapted to be connected to a lower end of the first support rod.

5. The modular tray system of claim 1, wherein the first support rod is assembled to one of the first and second connecting features of the tray at an upper end of the first support rod.

6. The modular tray system of claim 5, the supporting means further comprising a base that is assemblable to a lower end of the first support rod.

7. The modular tray system of claim 6, wherein the base comprises tines configured to penetrate into the first supporting structure.

8. The modular tray system of claim 6, wherein the base is configured to be placed on the first supporting structure.

9. The modular tray system of claim 6, wherein the base comprises cross supports, at least one of the cross supports having an opening therein that extends entirely therethrough.

10. The modular tray system of claim 9, the base further comprising a bar insertable into the opening and having a lower extension that is sized and configured to extend through the opening, protrude below the base, and penetrate the first supporting structure therebelow.

11. The modular tray system of claim 1, wherein the support throne comprises a threaded bore adapted to threadably receive the third connecting feature of the first support rod, and the supporting means further comprises a coupler configured to secure the first support rod to a vertical support member of the armrest of the chair.

12. The modular tray system of claim 1, wherein the support throne comprises:

an upper surface and a lower surface; and a tray connector protruding from the upper surface, the tray connector being the third connecting feature that is complementary to each of the first and second connecting features of the tray.

13. The modular tray system of claim 12, wherein the support throne further comprises a fourth connecting feature at the lower surface thereof, and the first support rod is assembled to the fourth connecting feature of the support throne at an upper end of the first support rod.

14. The modular tray system of claim 13, wherein the supporting means further comprises at least one coupler configured to secure the first support rod to a vertical support member of an armrest of the chair.

15. The modular tray system of claim 14, wherein the first support rod is retained within a first cylindrical portion of the coupler, the coupler comprising a second cylindrical portion having a hinge configured to pivot to an open position to accept the vertical support member of an armrest and pivot to a closed position to secure the vertical support member of an armrest.

16. The modular tray system of claim 12, wherein the supporting means further comprises a clamping unit having a bore extending from a first side of the clamping unit to a second side of the clamping unit, wherein the clamping unit is configured to be secured to an armrest of the chair.

17. The modular tray system of claim 16, wherein the bore of the clamping unit has a slot extending a length of the bore, wherein the slot in connection with the bore is configured to receive a flexible portion of the armrest of the chair.

18. The modular tray system of claim 17, where the clamping unit further comprises a fastener for securing the flexible portion of the armrest within the bore.

19. A method of supporting the modular tray system of claim 1 with the first supporting structure, the method comprising:

assembling the first support rod to one of the first and second connecting features of the tray at an upper end of the first support rod;

assembling a base to a lower end of the first support rod; and penetrating the base into the first supporting structure or placing the base on the first supporting structure.

20. A method of supporting the modular tray system of claim 1 with the second supporting structure, the method comprising:

assembling the support throne to one of the first and second connecting features of the tray at an upper surface of the support throne;

assembling the first support rod to a lower surface of the support throne;

securing the support throne to an armrest of a chair; and securing the first support rod to a vertical support member of the armrest, the chair being the second supporting structure.

* * * * *